US010757195B2

(12) United States Patent
Rojvongpaisal

(10) Patent No.: US 10,757,195 B2
(45) Date of Patent: Aug. 25, 2020

(54) DEVICE INTERCONNECTION AND SERVICE DISCOVERY VIA A COMMUNICATION CLOUD

(75) Inventor: Aekkarin Rojvongpaisal, Hacienda Heights, CA (US)

(73) Assignees: Sony Corporation, Tokyo (JP); SONY DADC US INC, Terra Haute, IN (US)

(*) Notice: Subject to any disclaimer, the term of this patent is extended or adjusted under 35 U.S.C. 154(b) by 1144 days.

(21) Appl. No.: 13/430,644

(22) Filed: Mar. 26, 2012

(65) Prior Publication Data

US 2012/0297075 A1 Nov. 22, 2012

Related U.S. Application Data

(60) Provisional application No. 61/519,099, filed on May 17, 2011.

(51) Int. Cl.
 *H04L 29/08* (2006.01)
(52) U.S. Cl.
 CPC ............ *H04L 67/141* (2013.01); *H04L 67/16* (2013.01)
(58) Field of Classification Search
 CPC .............................. H04L 67/141; H04L 67/16
 See application file for complete search history.

(56) References Cited

U.S. PATENT DOCUMENTS

| 9,729,625 | B1 * | 8/2017 | Davidson | ............ H04L 63/0428 |
| 2004/0148326 | A1 * | 7/2004 | Nadgir | .................. G06F 9/5072 |
| | | | | 709/200 |
| 2005/0157659 | A1 * | 7/2005 | Huitema | ........................ 370/254 |
| 2008/0181219 | A1 | 7/2008 | Chen et al. | |
| 2011/0138458 | A1 * | 6/2011 | Kumar | ..................... H04L 63/18 |
| | | | | 726/15 |
| 2011/0153727 | A1 | 6/2011 | Li | |
| 2011/0231473 | A1 * | 9/2011 | Narayanan et al. | .......... 709/203 |
| 2011/0252337 | A1 * | 10/2011 | Pignataro | ............ H04L 41/0266 |
| | | | | 715/748 |
| 2012/0233333 | A1 * | 9/2012 | Ganesan et al. | .............. 709/227 |
| 2013/0268612 | A1 * | 10/2013 | Witzel | .................... H04W 8/06 |
| | | | | 709/206 |

* cited by examiner

*Primary Examiner* — Kodzovi Acolatse
*Assistant Examiner* — Farhad Ali
(74) *Attorney, Agent, or Firm* — Haverstock & Owens LLP

(57) ABSTRACT

A system, method, and computer program product for allowing network enabled devices to interconnect via auto-discovery and manual discovery. The interconnections are made via a communication cloud, which is a resource on a server that acts as a transmission channel between authorized devices. The protocol includes a Communication Cloud Assignment that defines a process for designating a device to a cloud. Once a device is connected to a cloud, it uses a Service Discovery/Delivery Protocol to request and/or advertise its services to other devices on the cloud. Devices with appropriate criteria such as the same IP address, subnet, service protocol etc. will be placed on the same cloud; thus, those devices will automatically discover each other and their services. A device may be manually directed from its originating cloud to another cloud when a special code is entered.

13 Claims, 17 Drawing Sheets

RETRIEVE JABBER ID (JID)

- STEP 1: DETERMINE YOUR LOCAL HOST (SUBNET) IP ADDRESS

- STEP 2: SEND YOUR LOCAL HOST IP ADDRESS TO A DESIGNATED ID SERVER, E.G. www.xxx.com/ip2hash/ws?sn=[ip address]

- STEP 3: PARSE THE SERVER RESPONSE TO RETRIEVE YOUR JID

KONICHIWA:
JABBER CHAT ROOM

- STEP 1: LOGIN TO A DESIGNATED JABBER SERVER, IF NOT ALREADY.

- STEP 2: CREATE/JOIN A MULTI-USER CHAT ROOM WITH THE FOLLOWING ROOM NAMING SCHEMA:
"konichiwa-" + [JID] + "@ conference." + [Jabber URL]

- STEP 3: ASSIGN YOUR APPLICATION A UNIQUE NICKNAME. BELOW IS A TYPICAL NICKNAME CONVENTION:
[Local Host IP Address] + "-" + [current time in milliseconds]

- STEP 4: PERFORM KONICHIWA SERVICE DISCOVERY

FIG. 14

KONICHIWA: MESSAGE PROPERTY

TABLE 1: KONICHIWA MESSAGE PROPERTIES

| PROPERTY NAME | VALUE | DESCRIPTION |
|---|---|---|
| discovery-protocol | "konichiwa" | Name of this service discovery protocol |
| version | "1.0" | Service discovery protocol version number |
| type | (integer) (see Table 2: Konichiwa Message Types) | Integer representation of the message type |
| service-protocol | (String) | Service ID, e.g. "com.sony.miq.MIQServiceProtocol". This property may be used for advertising as well as requesting for a particular service. When performing a service discovery request, leaving this property null or empty ("") implies a request for all available services. A service advertisement message is invalid if this property = null or empty (""). |

FIG. 15

KONICHIWA:
MESSAGE PROPERTY (cont.)

| TABLE 2: KONICHIWA MESSAGE TYPES | |
|---|---|
| TYPE | DESCRIPTION |
| 1 | Service Advertisement message. Generally only to be used by service providers. |
| 2 | Service Discovery Request message. This is used for discovering available services. |

KONICHIWA:
MovieIQ Service Info

TABLE 3: MovieIQ Service Info, service-protocol = "com.sony.miq.MIQServiceProtocol"

| PROPERTY NAME | DESCRIPTIONS |
|---|---|
| bdlink | BDLink Code; a unique code created for each connecting session |
| org | Organization ID |
| disc | Disc ID |
| app | Application ID |
| lang | Language setting; typically a 3-character language format, e.g. "eng" for English |
| jid | Jabber ID; use for creating/joining a designated Jabber chat room |

**MovieIQ:
JABBER CHAT ROOM**

- STEP 1: LOGIN TO A DESIGNATED JABBER SERVER, IF NOT ALREADY.

- STEP 2: CREATE/JOIN A MULTI-USER CHAT ROOM WITH THE FOLLOWING ROOM NAMING SCHEMA:
"miq-" + [JID] + "_" + [BD-Link] "@ conference." + [Jabber URL]

- STEP 3: ASSIGN YOUR APPLICATION A UNIQUE NICKNAME. BELOW IS A TYPICAL NICKNAME CONVENTION:
[Local Host IP Address] + "_" + [current time in milliseconds]

- STEP 4: PERFORM MovieIQ COMMUNICATION AS NEEDED

DEVICE INTERCONNECTION AND SERVICE DISCOVERY VIA A COMMUNICATION CLOUD

CROSS-REFERENCE TO RELATED APPLICATIONS

This patent application claims priority under 35 U.S.C. 119(e) to provisional application U.S. Ser. No. 61/519,099 which was filed on May 17, 2011, and is entitled "DEVICE INTERCONNECTION AND SERVICE DISCOVERY VIA A COMMUNICATION CLOUD", which is hereby incorporated by reference in its entirety.

FIELD OF THE INVENTION

This patent application relates in general to network communications protocols, and more specifically to a protocol that allows internet enabled devices to interconnect via auto-discovery and manual discovery using a communication cloud.

BACKGROUND OF THE INVENTION

Internet enabled devices are becoming more common, and typically include television sets, set-top boxes, video disc players, video game consoles, smartphones, e-books, and even kitchen appliances, as well as conventional personal computers. Management of the interconnection of these devices to computing networks, such as the internet, can be complex and difficult. This patent application provides a viable approach to solving this challenge and presents a practical implementation of that technique.

SUMMARY OF THE EMBODIMENTS

A system, method, and computer program product for interconnecting network enabled devices are disclosed and claimed herein. An exemplary computer-implemented method embodiment may comprise generating a key with a connected device using its subnet address and sending the key to a server, generating a session with a server using the key and the IP address of the connected device and sending session information to the connected device, and connecting the connected device to a designated communication cloud using the session information. The server may first determine how the connected device is initially connected. The connected device may further use a service discovery protocol to request services from other devices on the cloud and/or advertise its services to other devices on the cloud. The connected device may advertise its service in response to a service discovery request. The connected communication cloud may be designated by manual discovery and/or automatic discovery. Connecting may further comprise the communication cloud authenticating and/or acknowledging the connection. The method may further comprise processing a service and/or ignoring a service. The service may include Jabber and MovieIQ.

A system embodiment may comprise a processor and a memory containing instructions that, when executed by the processor cause the processor to generate a key with a connected device using its subnet address and send the key to a server, generate a session with a server using the key and the IP address of the connected device and send session information to the connected device, and connect the connected device to a designated communication cloud using the session information.

A computer program product embodiment for interconnecting network enabled devices may comprise a non-transitory computer readable medium tangibly embodying non-transitory computer-executable program instructions thereon that, when executed, cause a computing device to generate a key with a connected device using its subnet address and send the key to a server, generate a session with a server using the key and the IP address of the connected device and send session information to the connected device, and connect the connected device to a designated communication cloud using the session information.

As described more fully below, the apparatus and processes of the embodiments disclosed enable interconnection of internet enabled devices. Further aspects, objects, desirable features, and advantages of the apparatus and methods disclosed herein will be better understood and apparent to one skilled in the relevant art in view of the detailed description and drawings that follow, in which various embodiments are illustrated by way of example. It is to be expressly understood, however, that the drawings are for the purpose of illustration only and are not intended as a definition of the limits of the claimed invention.

BRIEF DESCRIPTION OF THE DRAWINGS

FIG. 12 depicts retrieval of a Jabber chat room ID, according to an embodiment;

FIG. 13 depicts usage of the Konichiwa protocol for service discovery in a Jabber chat room, according to an embodiment;

FIG. 14 depicts a table of Konichiwa protocol message properties, according to an embodiment;

FIG. 15 depicts a table of Konichiwa protocol message types, according to an embodiment;

FIG. 16 depicts a table of MovieIQ service information, according to an embodiment;

FIG. 17 depicts usage of the Konichiwa protocol for MovieIQ communication in a Jabber chat room, according to an embodiment.

DETAILED DESCRIPTION OF EXEMPLARY EMBODIMENTS

Figure 1:
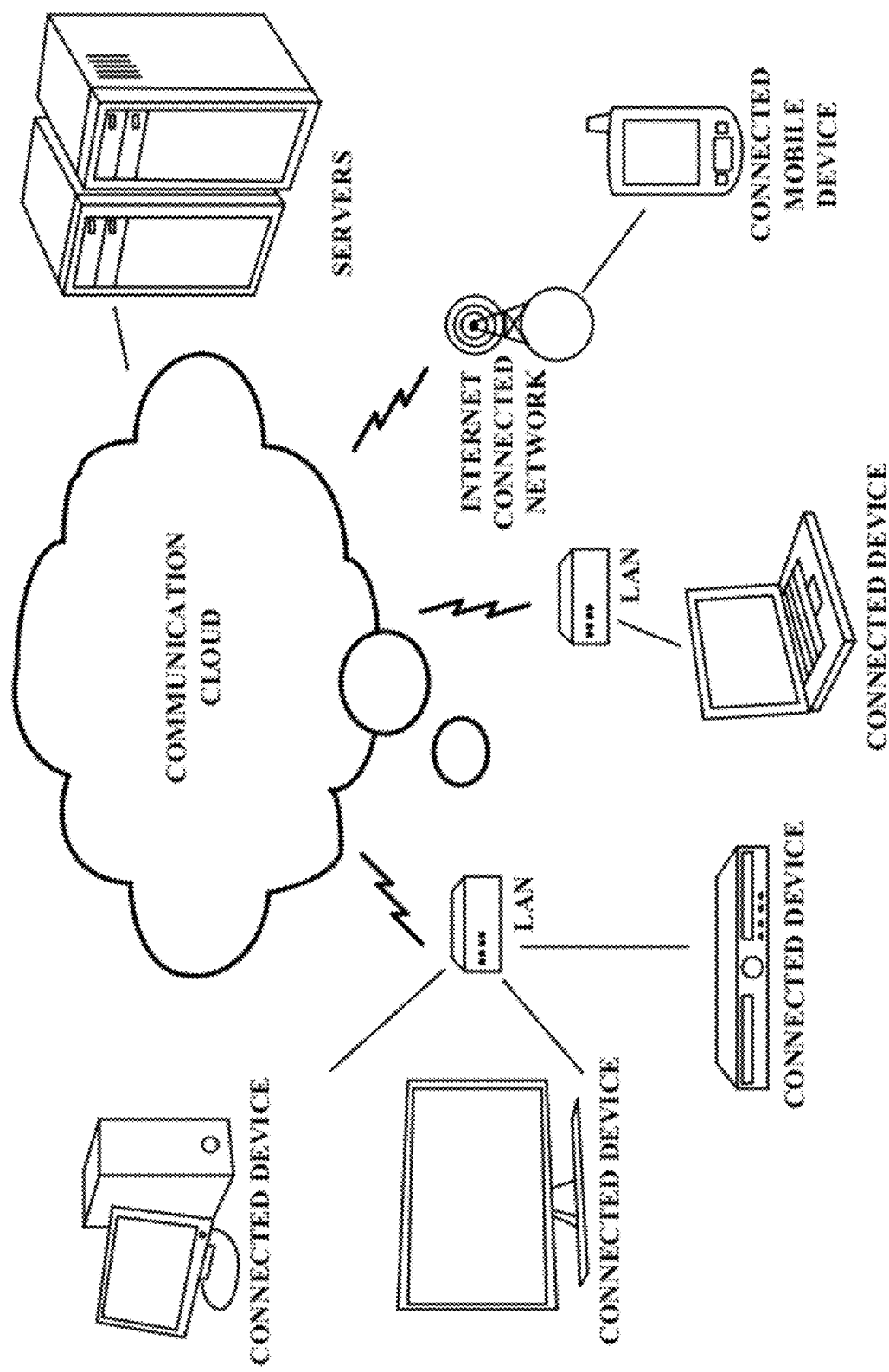
FIG. 1 depicts a cloud-based computing environment, according to an embodiment.

Referring now to FIG. 1, a cloud-based computing environment is shown. Various connected devices, including mobile devices, are connected to local area networks (LANs) or to an internet connected network, each of which are connected to a "communication cloud". The communication cloud refers to an infrastructure for providing networked computing, so that an "on-demand" environment may be enabled for any subscription-based or hosted computational resource, typically via the internet.

Cloud computing thus generally refers to an abstraction of resources and the network infrastructure needed to access resources of the cloud. The terms "service" or "services" are used to refer to such abstracted resources. The provided resources may be quite varied, and the clients being served may be quite diverse as well. Clients include software and devices, as well as users thereof, that are capable of accessing cloud services.

Unlike a traditional application program, where the application and its data are stored on a local storage device, with cloud services this information is typically stored on remote servers. The term "server" generally refers to a computing device executing one or more software programs, typically in a networked environment. However, a server may also be implemented as a virtual server (a software program) executed on one or more computing devices.

Web services may be located on servers within an enterprise or online (a hosted offering) and accessed by clients for a wide variety of operations. Document sharing, search, analysis, reporting, and data mining are just a few examples of web services. Web service hosts may support different operations and/or authentication schemes. In cloud computing, a client often needs to connect to different clouds to receive different services.

Unfortunately, there is no standardized or seamless interconnection among services to which a user or client may subscribe. There is no "one stop shopping" for transparently utilizing multiple offerings from multiple service providers. For example, at present a user or client would need to use and therefore reconfigure different accounts, user interfaces, applications, network connections, payment strategies, etc., to move between clouds/services. Currently each service provider has a proprietary environment providing cloud services, and hence proprietary account management, data formats, etc.

Embodiments of the present invention therefore provide a protocol that allows internet enabled devices to connect with each other, via automatic or manual discovery, over a communication cloud. The protocol, termed the Konichiwa protocol, comprises two basic parts, a Communication Cloud Assignment and a Service Discovery/Delivery Protocol. The Communication Cloud Assignment defines a process for designating a device to a cloud. Once a device is connected to a cloud, it will use the Service Discovery/Delivery Protocol to request and/or advertise its service with other devices on the cloud.

Figure 2:
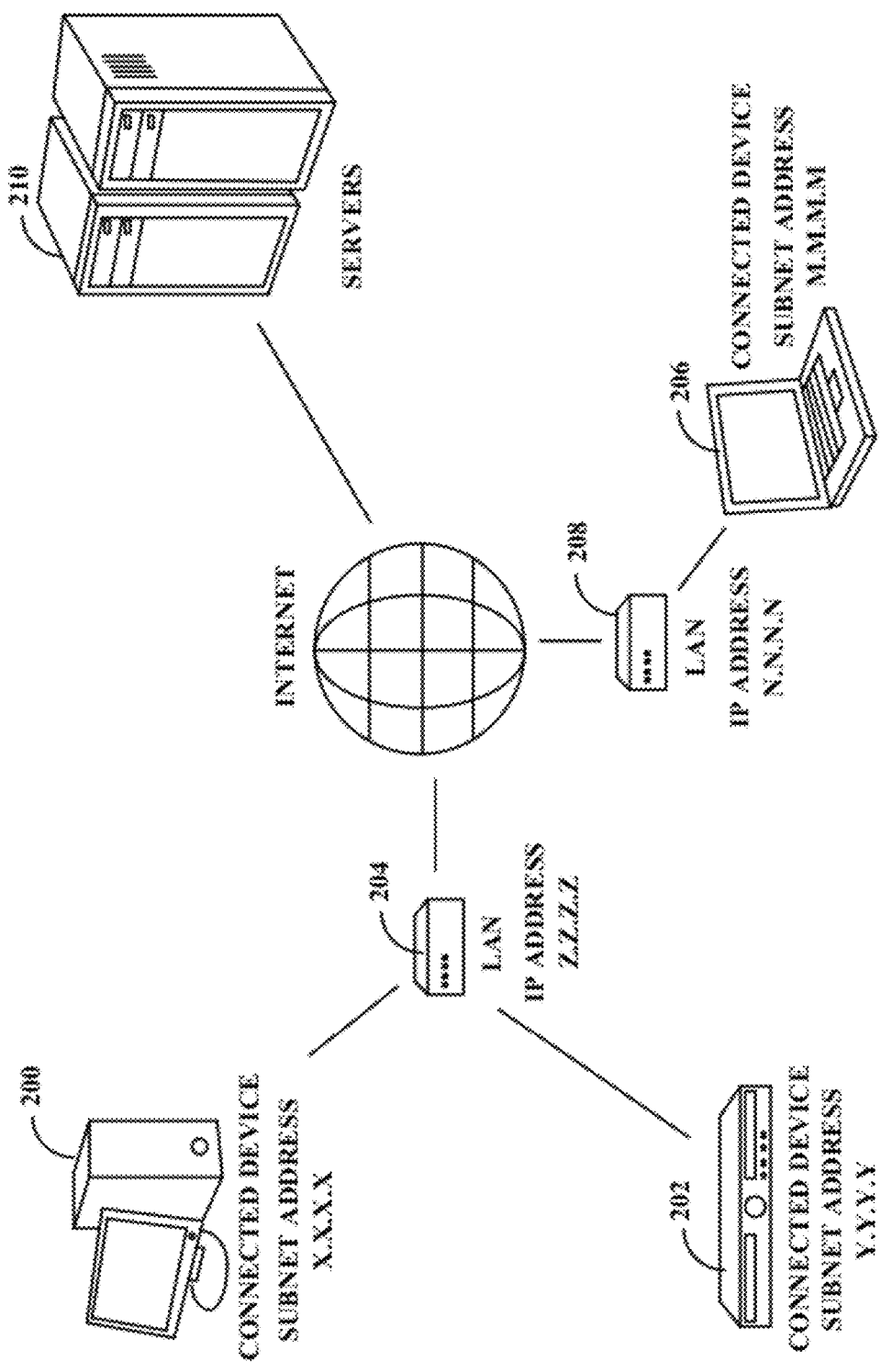
FIG. 2 depicts addressing of connected devices in a cloud-based computing environment, according to an embodiment.

Referring now to FIG. 2, addressing of connected devices in a cloud-based computing environment is shown. Connected devices 200 and 202 are connected to LAN 204. Connected device 206 is connected to another LAN 208. The LANs are connected to the internet. Servers 210 are also connected to the internet.

Each LAN has an Internet Protocol (IP) address, noted here as either Z.Z.Z.Z or N.N.N.N for example. An IP address is a numerical label assigned to each device (e.g. computer, printer, router, etc.) participating in a computer network that uses the Internet Protocol for communication. A subnetwork, or subnet, is a logically visible subdivision of an IP network. In this case, the connected devices have subnet addresses noted as either X.X.X.X, Y.Y.Y.Y, and M.M.M.M for example.

Figure 3:
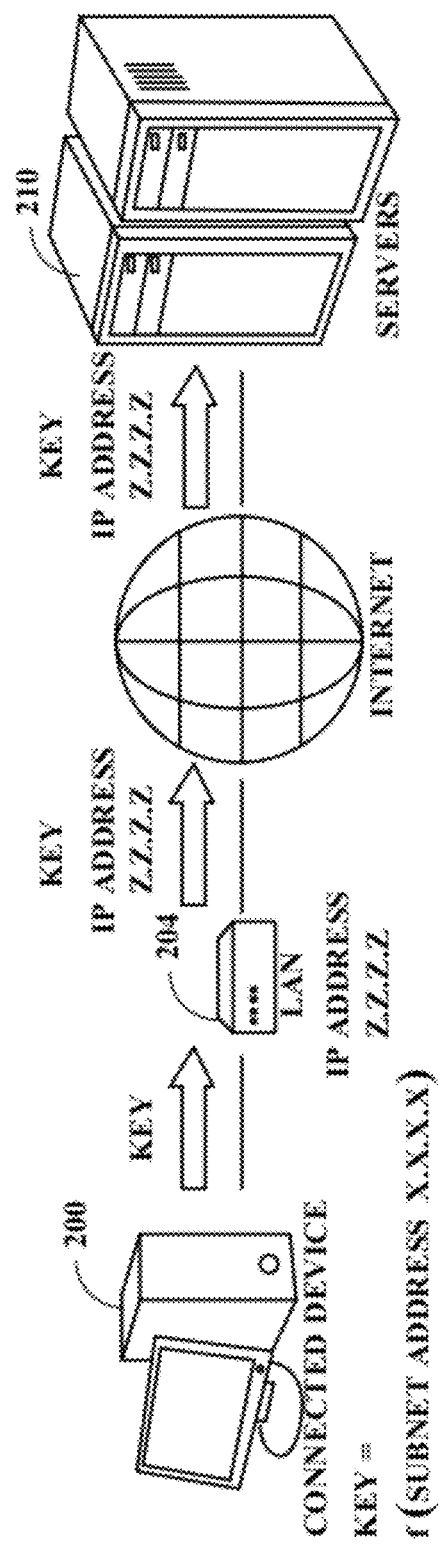
FIG. 3 depicts generation and transmission of a connected device key in a cloud-based computing environment, according to an embodiment.

Referring now to FIG. 3, generation and transmission of a connected device key in a cloud-based computing environment is shown. This is the beginning of the Communication Cloud Assignment portion of the protocol. Connected device 200 generates a key that is a function of its subnet address, in this case denoted as X.X.X.X. The key is passed to LAN 204, which has an IP address denoted as Z.Z.Z.Z. The LAN passes the key to servers 210 via the internet, for example.

Figure 4:
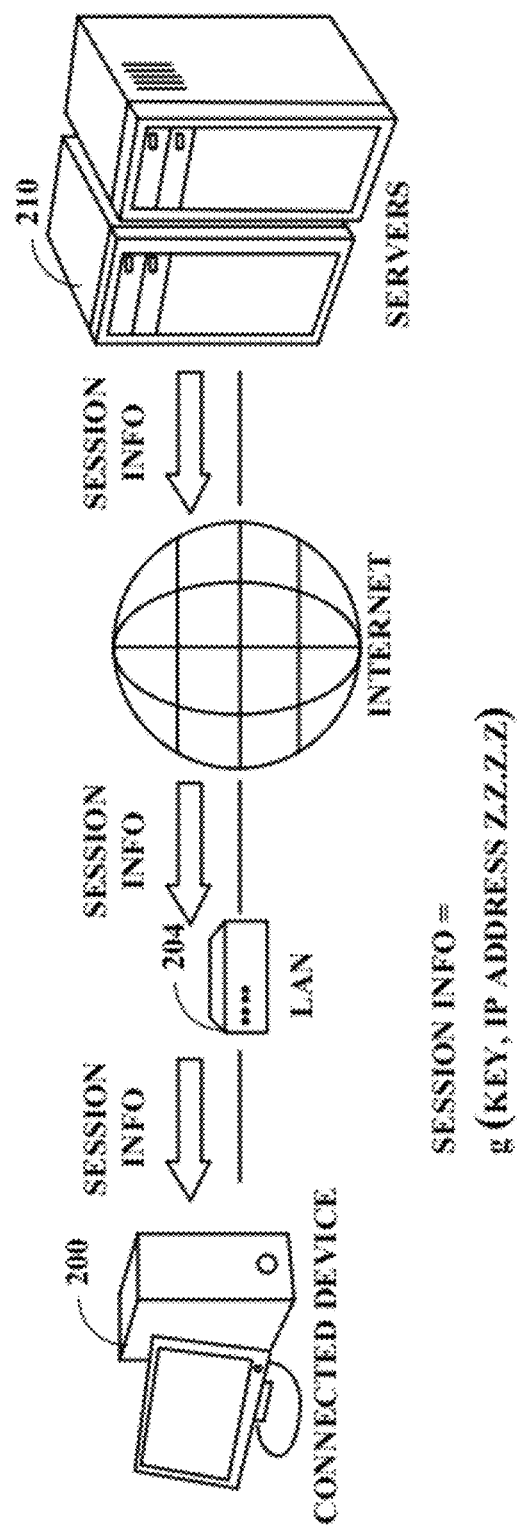
FIG. 4 depicts generation and transmission of session information in a cloud-based computing environment, according to an embodiment.

Referring now to FIG. 4, generation and transmission of session information in a cloud-based computing environment is shown. Servers 210 generate session information and pass the session information to LAN 204 via the internet. The session information is generated as a function of the key and internet address of the device to which connected device 200 is attached, in this case LAN 204. The session information includes data related to and/or directing assignment of a device to a particular communication cloud for connection.

Figure 5:
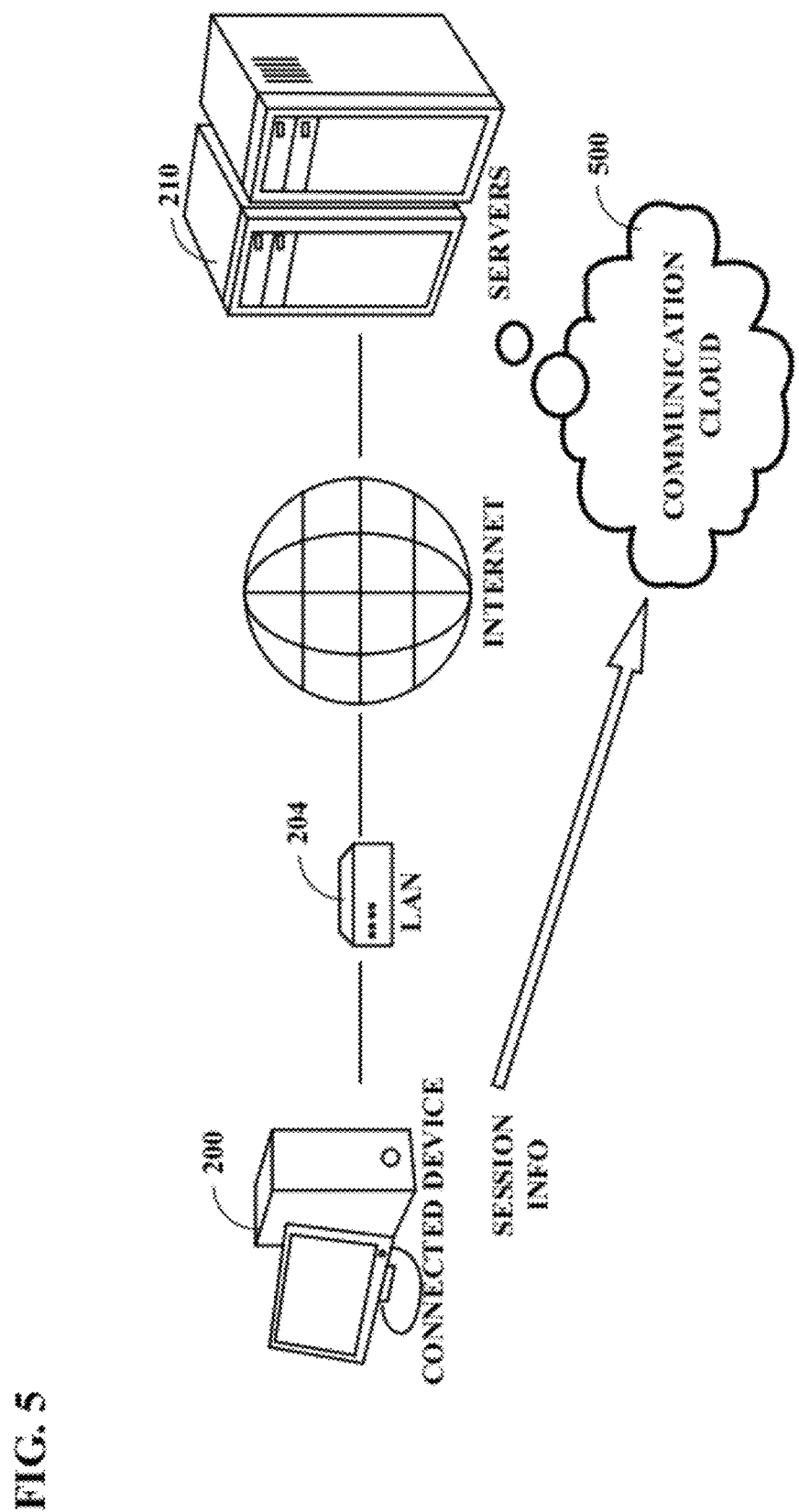
FIG. 5 depicts connection of a device to the communication cloud in a cloud-based computing environment, according to an embodiment.

Referring now to FIG. 5, connection of a device to the communication cloud in a cloud-based computing environment is shown. Connected device 200 uses the session information to connect to a designated communication cloud 500. Note that unlike conventional client/server systems, embodiments of the present invention do not require server 210 to govern the communications that occur after a connected device is attached to a communication cloud. Server 210 acts essentially as a dispatcher to facilitate device connection. Thereafter, connected devices may communicate with each other via the communication cloud without further server involvement.

Figure 6:
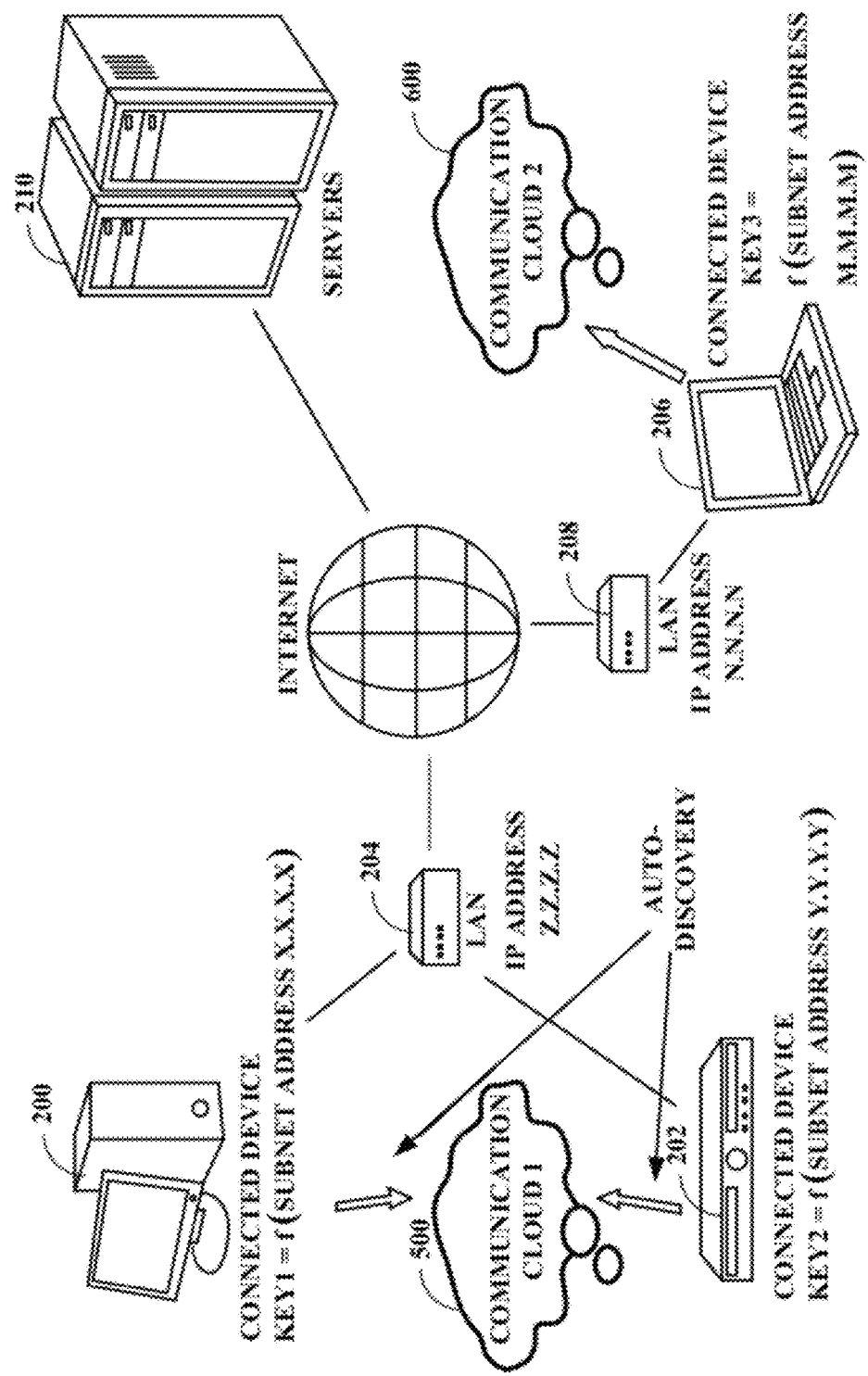
FIG. 6 depicts automatic discovery of connected devices in a cloud-based computing environment, according to an embodiment.

Referring now to FIG. 6, automatic discovery of connected devices in a cloud-based computing environment is shown. At this point, the Communication Cloud Assignment portion of the protocol has connected the various devices. Servers 210 or other servers or connected devices may seek to determine how any particular connected device is currently connected to any particular communication cloud, using an automatic discovery process. In this example, connected devices 200 and 202 are connected to a first communication cloud 500, while connected device 206 is connected to another communication cloud 600. This information may be acquired from the session information from when the connection of each device was established.

Figure 7:
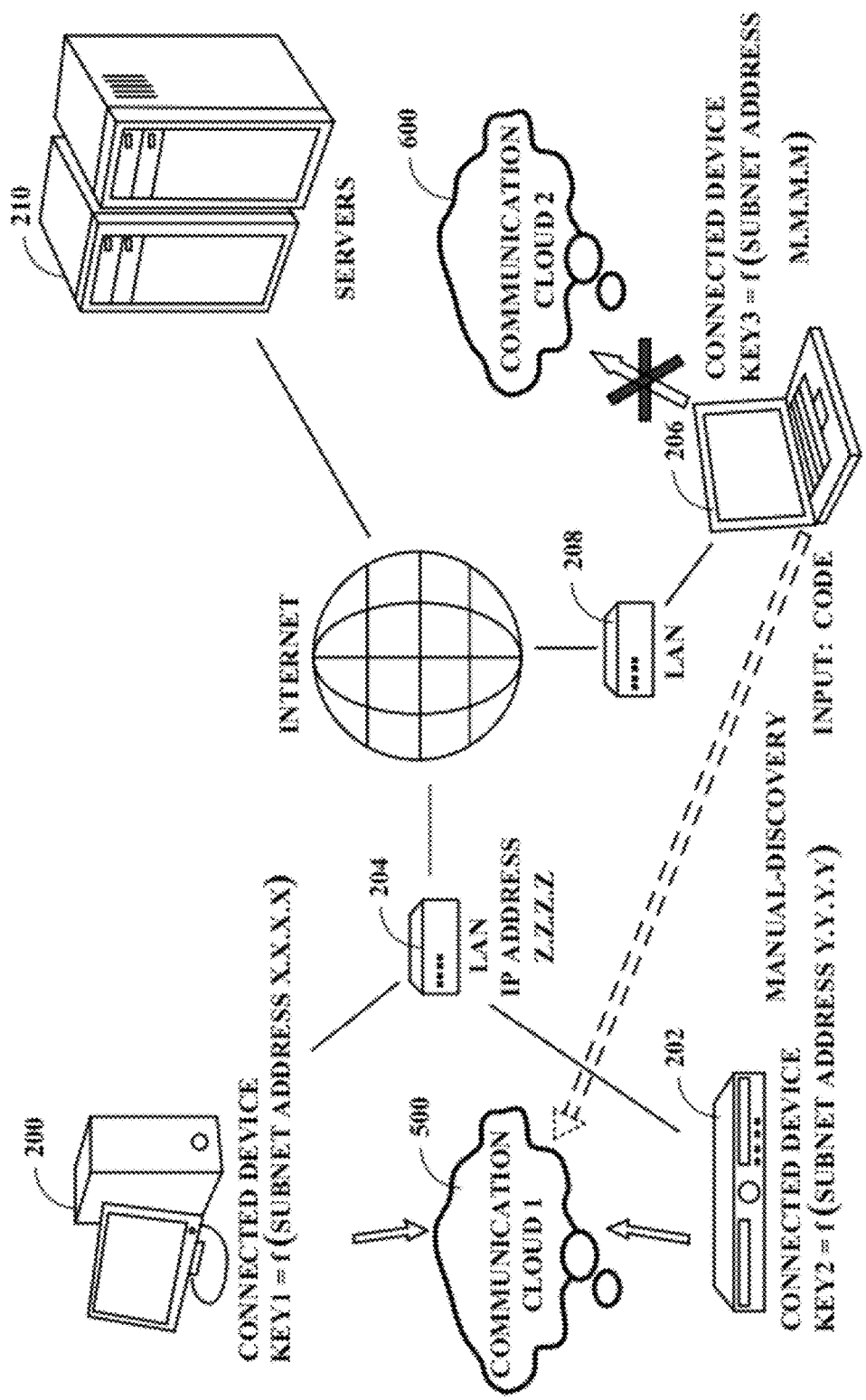
FIG. 7 depicts manual discovery of a connected device in a cloud-based computing environment, according to an embodiment.

Referring now to FIG. 7, manual discovery of a connected device in a cloud-based computing environment is shown. In this example, connected device 206 is connected to communication cloud 500 instead of communication cloud 600 as previously shown, when it acquires a specific input code that enables access.

In general, devices with appropriate criteria, such as possessing the same IP address, subnet, service protocol, etc. will be placed on the same cloud. Thus, those devices will automatically discover each other, and their services as will be described. A manual discovery is allowed when a special code is entered into a device to redirect it from its originally designated cloud to the desired one. Details of the Service Discovery/Delivery Protocol portion of the overall protocol are now provided.

Figure 8:
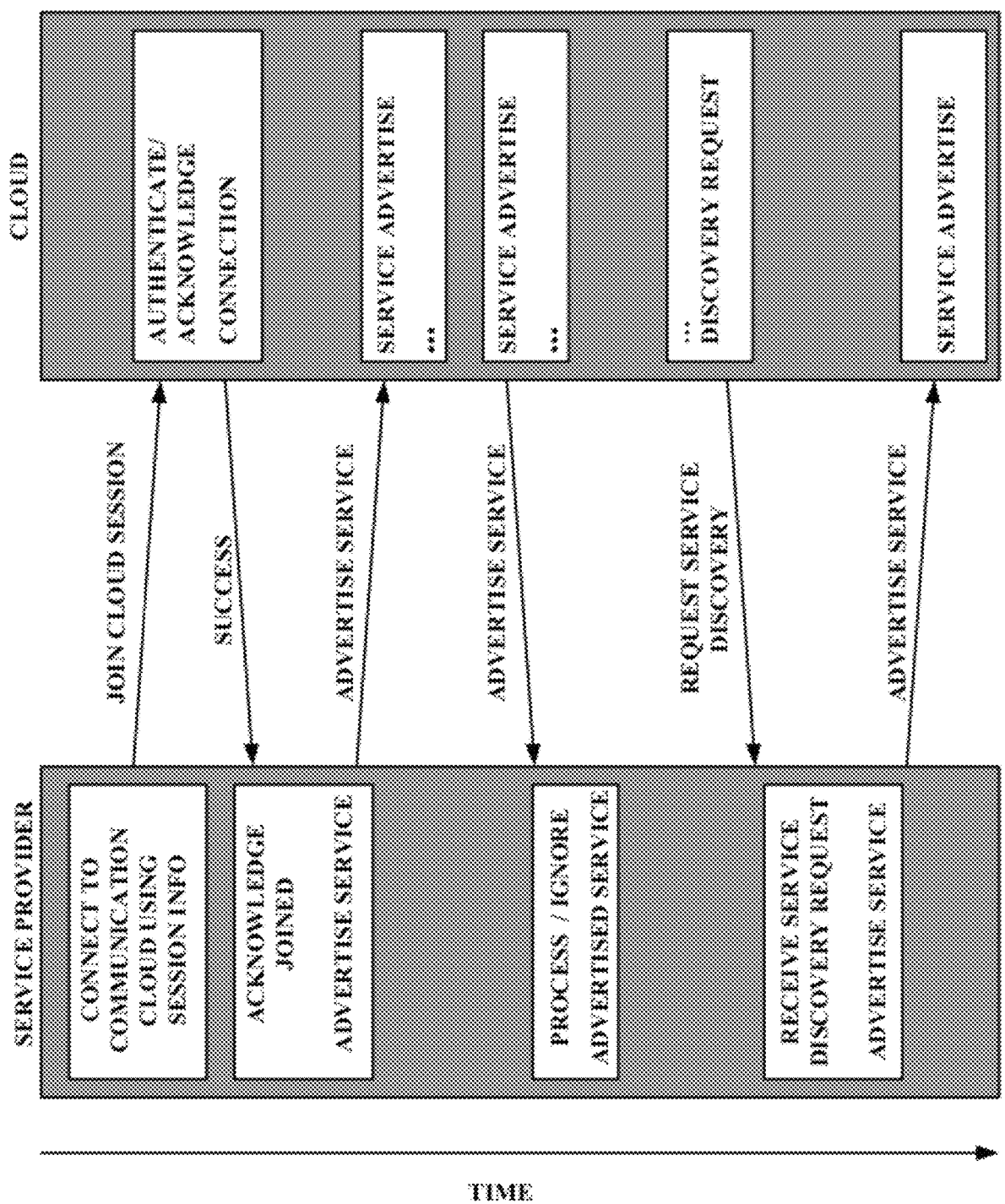
FIG. 8 depicts an event sequence between a service provider and a communication cloud in a cloud-based computing environment, according to an embodiment.

Referring now to FIG. 8, an event sequence between a service provider and a communication cloud in a cloud-based computing environment is shown. First, a service provider joins a cloud session by connecting to a communication cloud using session information as previously described. This connection succeeds when the cloud authenticates and acknowledges the connection. Next, the service provider acknowledges that it has joined the cloud session, and then advertises an available service to the cloud (and thus to any other connected devices). The cloud may similarly advertise an available service to the service provider, which may either process or ignore the advertised service. The cloud may also seek to discover what services are available from the service provider by sending a request for service discovery. When the service provider receives the discovery request, it may respond by advertising a service to the cloud.

Figure 9:
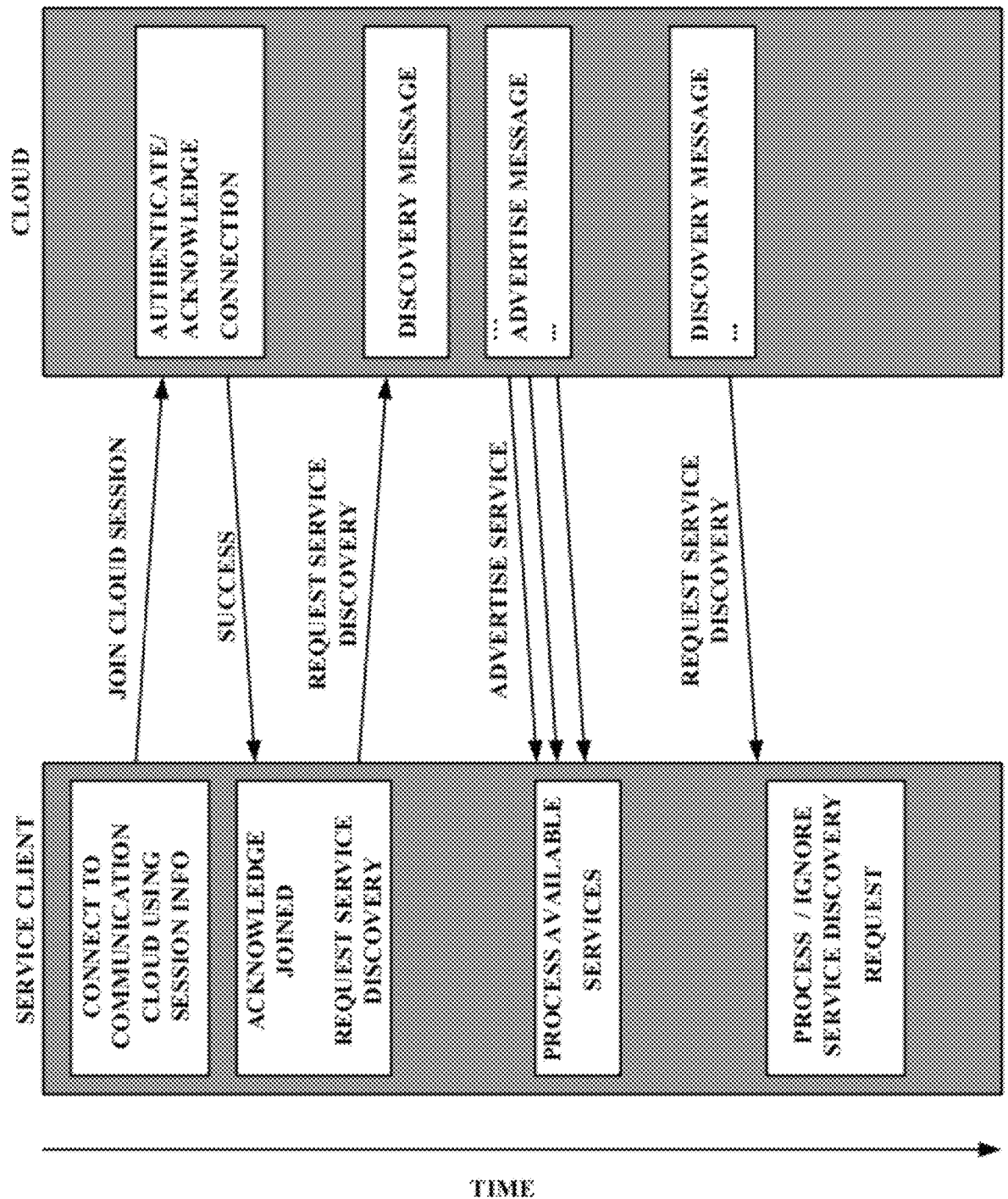
FIG. 9 depicts an event sequence between a service client and a communication cloud in a cloud-based computing environment, according to an embodiment.

Referring now to FIG. 9, an event sequence between a service client and a communication cloud in a cloud-based computing environment is shown. First, a service client joins a cloud session by connecting to a communication cloud using session information as previously described. This connection again succeeds when the cloud authenticates and acknowledges the connection. Next, the service client acknowledges that it has joined the cloud session, and then sends a service discovery request to the cloud. The cloud will then transmit advertisements for available services to the service client. Available services of interest may be selected by the service client for use. The cloud may also seek to discover what services are available from the service client by sending a request for service discovery. When the service client receives the discovery request, it may either ignore it or respond.

Figure 10:
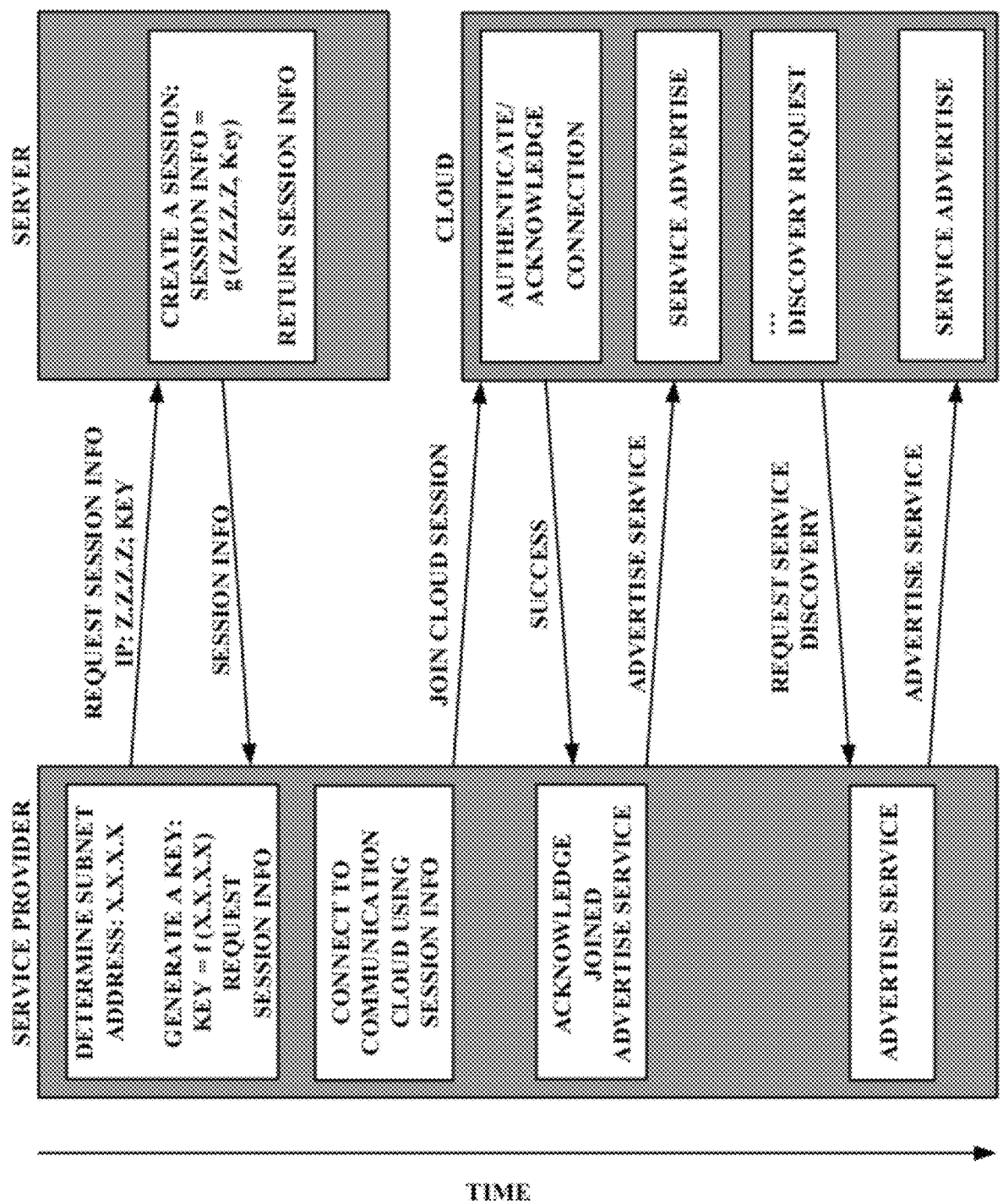
FIG. 10 depicts an event sequence between a service provider and a server and a communication cloud in a cloud-based computing environment, according to an embodiment.

Referring now to FIG. 10, an event sequence between a service provider and a server and a communication cloud in a cloud-based computing environment is shown. This figure denotes the initial exchange between the service provider and a server, and then the service provider and the cloud communicate as previously described. First, the service provider determines the subnet address of its connected device, e.g. connected device 200 having subnet address X.X.X.X, and then generates a key that is a function of the subnet address. The service provider then requests session information from the server, which is sent via LAN 204 for example using the Z.Z.Z.Z IP address. Next, the server creates a session by generating session information via a function that operates on the provided IP address and the key. The server returns the session information to the service provider. The session information is used by the service provider to join the cloud session, etc.

Figure 11:
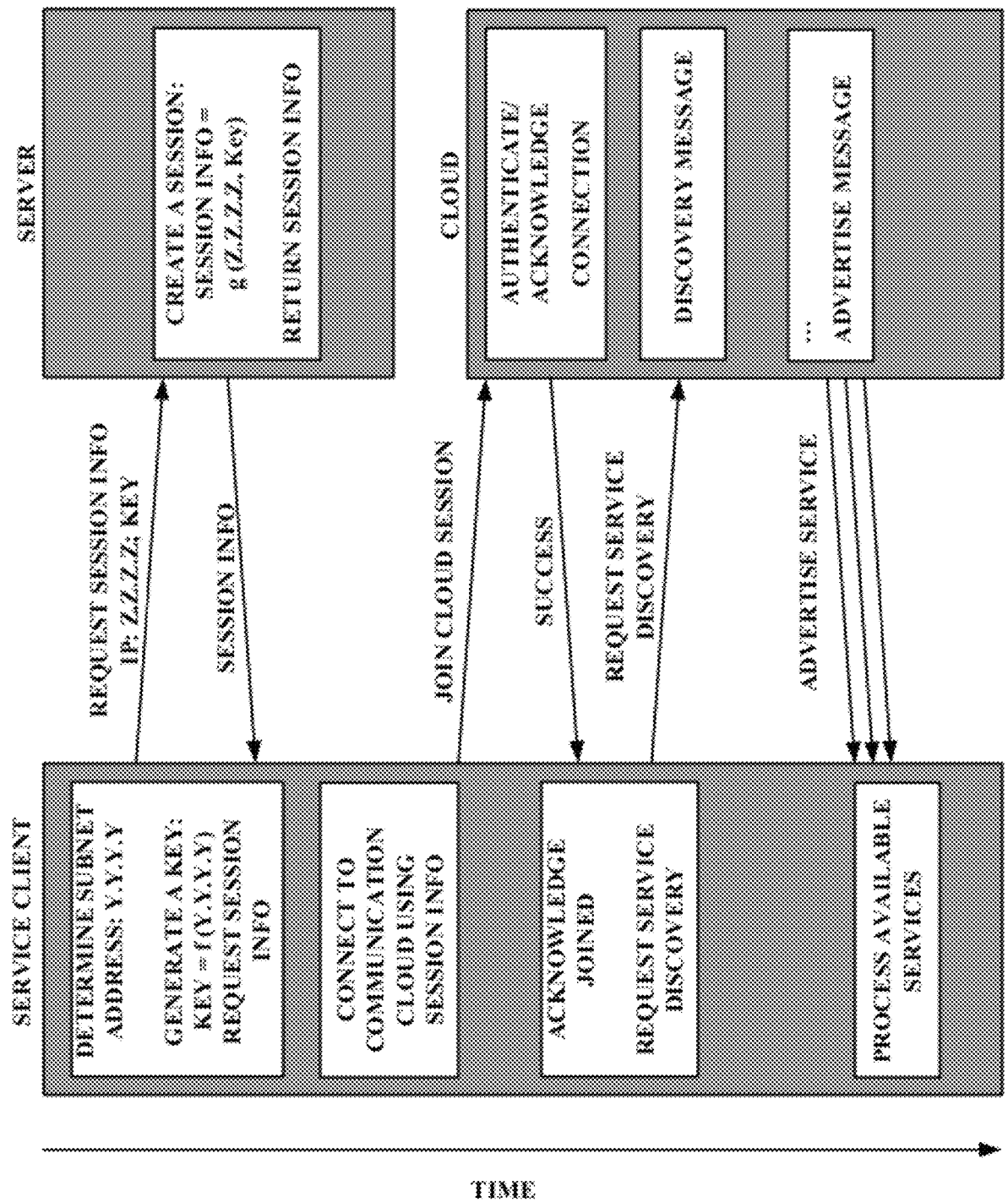
FIG. 11 depicts an event sequence between a service client and a server and a communication cloud in a cloud-based computing environment, according to an embodiment.

Referring now to FIG. 11, an event sequence between a service client and a server and a communication cloud in a cloud-based computing environment is shown. This figure denotes the initial exchange between the service client and a server, and then the service client and the cloud communicate as previously described. First, the service client determines the subnet address of its connected device, e.g. connected device 202 having subnet address Y.Y.Y.Y, and then generates a key that is a function of the subnet address. The service client then requests session information from the server, which is also sent via LAN 204 for example using the Z.Z.Z.Z IP address. Next, the server creates a session by generating session information via a function that operates on the provided IP address and the key for the service client's connected device 202. The server returns the session information to the service client. The session information is used by the service client to join the cloud session, etc.

Referring now to FIG. 12, retrieval of a Jabber chat room ID is shown. Jabber, also known as Extensible Messaging and Presence Protocol (XMPP), is an open-standard communications protocol for message-oriented middleware based on XML. It was developed in 1999 for near-real-time, extensible instant messaging, presence information, and contact list maintenance. The protocol is also used in VoIP and file transfer signaling.

In this instance, the Jabber chat room is the environment for an exemplary use of the Konichiwa protocol. First, a local host's IP address (or subnet address) is determined. Next, the IP address is sent to a designated Jabber ID server, which may for example be at a URL: www.xxx.com/ip2hash/ws?sn=[ip address]

Finally, the server's response is parsed to retrieve the Jabber ID (or JID).

Referring now to FIG. 13, usage of the Konichiwa protocol for service discovery in a Jabber chat room is shown. First, a user logs in to a designated Jabber server, if not already logged in. Next, the user creates or joins a multi-user chat room with the required schema, e.g. "konichiwa−"+ [JID]+"@conference."+[Jabber URL], where + denotes concatenation. Then, the user's application is assigned a unique nickname. One typical nickname convention is to append the current time in milliseconds to the host IP address, as it is unlikely two such applications would start at precisely the same millisecond. The application nickname would thus be [Local Host IP Address]+"−" [current time in milliseconds]. The Konichiwa protocol Service Discovery/Delivery Protocol is then performed.

The Service Discovery/Delivery Protocol defines a way for connected devices to advertise and request available services, in this case over a Jabber chat room. A service provider, e.g. a BD-J (Blu-Ray Disc Java) application, will advertise its service by sending a service advertisement message. A service client, e.g. a display device, can send a service discovery request message to detect available services and their providers via service advertisement messages. A service advertisement message may be broadcasted multiple times by the same service provider. It is up to the application to manage its list of available services accordingly.

Both service advertisements and discovery requests contain the same list of Konichiwa message properties, described below. However, the service advertisement message also contains a service info field that houses service protocol specific data. The data structure of a service info field is defined per that service's specification and will most likely vary across different services.

Referring now to FIG. 14, a table of Konichiwa protocol message properties is shown. Each property's name, value, and description are provided in Table 1. In Jabber messages, these properties can be found in a chat message under <property> tags. The property 'discovery-protocol' has the value "konichiwa", which is the name of the service discovery protocol being used. The property 'version' has the value "1.0", which is the service discovery protocol version number. The property 'type' has the value of (integer), which is further detailed below. The property 'service-protocol' has the value of (String), as this property is the Service ID, such as "com.sony.miq.MIQServiceProtocol". This property may be used for advertising as well as for requesting a particular service. When performing a service delivery request, leaving this property null or empty (" ") implies a request for all available services. A service advertisement is invalid if this property is null or empty.

Referring now to FIG. 15, a table of Konichiwa protocol message types is shown. Type 1 messages are service advertisement messages, typically only to be used by service providers. Type 2 messages are service discovery request messages, used for discovering available services.

Referring now to FIG. 16, a table of MovieIQ service information is shown. Many people interrupt their movie-watching experience to look up the filmography of an actor or to find out more about a song playing in the background. With MovieIQ, movie lovers can learn more about the movie they are watching without leaving their sofa. MovieIQ is a service available to users of an internet-connected Blu-ray player and a MovieIQ-enabled Blu-ray disc. It takes full advantage of the Blu-ray format's internet connectivity to provide immediate access to a continuously-updated movie database. The database links scenes within the movie with data related to cast and crew, production facts, music and soundtrack information, as well as other movies, franchises, and TV episodes. The global video database contains factual metadata, synopses, credits, and detailed descriptive elements. Once connected to a Konichiwa communication channel, an application will perform the Konichiwa Service Discovery/Delivery protocol.

FIG. 16 provides the MovieIQ service information; the data format is defined per the MovieIQ service protocol specification. The Konichiwa advertised service information is located in the <body> field of a Jabber chat message, per that service's specification. The property 'bdlink' is the BDLink Code, a unique code created for each connecting session. The 'org', 'disc', and 'app' properties describe IDs for an organization, disc, and application, respectively. The 'lung' property describes a language setting, e.g. a 3-character format is typical. The 'jid' property is the Jabber ID used for creating/joining a designated Jabber chat room. Property assignments follow this schema (note "|" is a pipe character): [property name]+"="+[value]+"|"+[optional property assignment]

Exemplary messages are now provided. A MovieIQ service request message is:

```
<message from="..." to="...">
<body></body>
<property name="discovery-protocol" value="konichiwa"/>
<property name="version" value=1.0"/>
<property name="type" value="2"/>
<property name="service-protocol"
value="com.sony.miq.MIQServiceProtocol"/>
```

An exemplary MovieIQ service advertisement message is:

```
<message from="..." to="...">
<body>bdlink=abc123|org=7fff7667|disc=0x8000000..0|app=4000|lang=eng|jid=0123456789abc
defghijklmnopqrstuv_vwxyz—missing_u|</body>
<property name="discovery-protocol" value="konichiwa"/>
<property name="version" value=1.0"/>
<property name="type" value="1"/>
<property name="service-protocol" value="com.sony.miq.MIQServiceProtocol"/>
```

Referring now to FIG. 17, usage of the Konichiwa protocol for MovieIQ communication in a Jabber chat room is shown. First, log into a designated Jabber server, if not already logged in. Next, create/join a multi-user chat room with the following naming schema: "miq-"+[JID]+"-"+[BD-Link] "@conference."+[Jabber URL]

Next, assign the application a unique nickname, e.g. [Local Host IP Address]+"-"+[current time in milliseconds].

Finally, perform MovieIQ communication as needed.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While the invention has been described in connection with specific examples and various embodiments, it should be readily understood by those skilled in the art that many modifications and adaptations of the embodiments described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

What is claimed is:

1. A computer-implemented method for interconnecting network enabled devices, comprising:
   generating a key with a device based on a subnet address of the device, and sending the key to a server, wherein the device is coupled with the server via a network routing device;
   requesting session information of a session from the server;
   generating the session with the server using a two-step function that operates on both the key and an IP address of the network routing device, and sending the session information to the device, wherein the session information is a result of generating the session, wherein generating the session includes determining the IP address, sending the IP address to the server and parsing a response from the server to retrieve identification information, wherein the session information includes data directing assignment of the device to a designated communication cloud;
   connecting the device to the designated communication cloud using the session information, wherein the device includes an application assigned a unique name, wherein the unique name comprises a current time in milliseconds appended to a host IP address, wherein the designated communication cloud is designated by one of manual discovery and automatic discovery, wherein the manual discovery is permitted when a special code is entered into the device to redirect the device from an originally designated cloud to a desired cloud;
   advertising one or more available services over a chat room, wherein advertising the one or more available services is performed by sending a service advertisement message; and
   at least one of processing a service and ignoring a service, wherein the service is at least one of Jabber and MovieIQ, wherein the service includes service information comprising a first property which is a unique code generated for each connecting session, an organization property for identifying an organization, an application property for identifying an application, a language property for language settings and a Jabber ID for generating/joining a designated Jabber chat room.

2. The method of claim 1 further comprising the server first determining how the connected device is initially connected.

3. The method of claim 1, further comprising the connected device using a service discovery protocol to at least one of request services from other devices on the cloud and advertise its services to other devices on the cloud.

4. The method of claim 3 wherein the connected device advertises its service in response to a service discovery request.

5. The method of claim 1 wherein the connecting further comprises the communication cloud at least one of authenticating and acknowledging the connection.

6. A system for interconnecting network enabled devices, comprising:
   a processor; and
   a memory containing instructions that, when executed by the processor cause the processor to:
     generate a key with a device based on a subnet address of the device, and send the key to a server, wherein the device is coupled with the server via a network routing device;
     request session information of a session from the server;
     generate the session with the server using a two-step function that operates on both the key and an IP address of the network routing device, and send the session information to the device, wherein the session information is a result of generating the session, wherein generating the session includes determining the IP address, sending the IP address to the server and parsing a response from the server to retrieve identification information, wherein the session information includes data directing assignment of the device to a designated communication cloud;
     connect the device to the designated communication cloud using the session information, wherein the device includes an application assigned a unique name, wherein the unique name comprises a current time in milliseconds appended to a host IP address, wherein the designated communication cloud is designated by one of manual discovery and automatic discovery, wherein the manual discovery is permitted when a special code is entered into the device to redirect the device from an originally designated cloud to a desired cloud; and
     advertise one or more available services over a chat room, wherein advertising the one or more available services is performed by sending a service advertisement message; and
     at least one of process a service and ignore a service, wherein the service is at least one of Jabber and MovieIQ, wherein the service includes service information comprising a first property which is a unique code generated for each connecting session, an organization property for identifying an organization, an application property for identifying an application, a language property for language settings and a Jabber ID for generating/joining a designated Jabber chat room.

7. The system of claim 6, wherein the server first determines how the connected device is initially connected.

8. The system of claim 6, wherein the connected device uses a service discovery protocol to at least one of request services from other devices on the cloud and advertise its services to other devices on the cloud.

9. The system of claim 8 wherein the connected device advertises its service in response to a service discovery request.

10. The system of claim 6, wherein the connected communication cloud is designated by one of manual discovery and automatic discovery.

11. The system of claim 6 wherein the connecting further comprises the communication cloud at least one of authenticating and acknowledging the connection.

12. A computer program product for interconnecting network enabled devices, comprising a non-transitory computer readable medium tangibly embodying non-transitory computer executable program instructions thereon that, when executed, cause a computing device to:

generate a key with a device based on a subnet address of the device, and send the key to a server, wherein the device is coupled with the server via a network routing device;

request session information of a session from the server;

generate the session with the server using a two-step function that operates on both the key and an IP address of the network routing device, and send the session information to the device, wherein the session information is a result of generating the session, wherein generating the session includes determining the IP address, sending the IP address to the server and parsing a response from the server to retrieve identification information, wherein the session information includes data directing assignment of the device to a designated communication cloud; and connect the device to the designated communication cloud using the session information, wherein the device includes an application assigned a unique name, wherein the unique name comprises a current time in milliseconds appended to a host IP address, wherein the designated communication cloud is designated by one of manual discovery and automatic discovery, wherein the manual discovery is permitted when a special code is entered into the device to redirect the device from an originally designated cloud to a desired cloud; and advertise one or more available services over a chat room, wherein advertising the one or more available services is performed by sending a service advertisement message; and at least one of process a service and ignore a service, wherein the service is at least one of Jabber and MovieIQ, wherein the service includes service information comprising a first property which is a unique code generated for each connecting session, an organization property for identifying an organization, an application property for identifying an application, a language property for language settings and a Jabber ID for generating/joining a designated Jabber chat room.

13. A system for interconnecting network enabled devices, comprising:

a server;

a local area network (LAN) coupled with the server; and a computing device configured to generate a key based on a subnet address of the computing device and send the key to the server, the computing device further configured to request session information of a session from the server, wherein the computing device is coupled with the server via the LAN;

wherein the server generates the session using a two-step function that operates on both the key and an IP address of the LAN and sends the session information to the computing device, wherein the session information is a result of generating the session, and further wherein the computing device establishes a communication link to a designated communication cloud with the session information, wherein generating the session includes determining the IP address, sending the IP address to the server and parsing a response from the server to retrieve identification information, wherein the session information includes data directing assignment of the computing device to a designated communication cloud, wherein the computing device includes an application assigned a unique name, wherein the unique name comprises a current time in milliseconds appended to a host IP address, wherein the designated communication cloud is designated by one of manual discovery and automatic discovery, wherein the manual discovery is permitted when a special code is entered into the device to redirect the device from an originally designated cloud to a desired cloud, wherein the computing device advertises one or more available services over a chat room, wherein advertising the one or more available services is performed by sending a service advertisement message; and wherein the server implements at least one of processing a service and ignoring a service, wherein the service is at least one of Jabber and MovieIQ, wherein the service includes service information comprising a first property which is a unique code generated for each connecting session, an organization property for identifying an organization, an application property for identifying an application, a language property for language settings and a Jabber ID for generating/joining a designated Jabber chat room.

* * * * *